Patented Apr. 12, 1949

2,466,854

UNITED STATES PATENT OFFICE 2,466,854

PRODUCTION OF POLYAMIDES

Theodoor Koch, Oosterbeek, Netherlands, assignor to American Enka Corporation, Enka, N. C., a corporation of Delaware No Drawing. Application November 7, 1946, Serial No. 708,452. In the Netherlands December 14, 1945

4 Claims. (Cl. 260—78)

This invention relates to the preparation of macromolecular polycondensation products obtained from omega-amino normal saturated aliphatic acid amides having at least six carbon atoms. More particularly, the invention relates to the preparation of polycondensation products of the kind indicated by condensing amino acid amides corresponding to the formula $$H_2N.CH_2—(CH_2)_n—CO.NH_2$$

where $n$ is an integer at least 4, and to the polycondensation products so obtained.

One of the principal objects of the present invention is to provide a new and improved method for preparing macromolecular polycondensation products by the polycondensation of monomeric omega-amino acid amides, and particularly the class of omega-amino straight-chain saturated aliphatic acid amides having at least six carbon atoms. Another object of the invention is to provide new compositions of matter comprising the polycondensation products so obtained. A still further object of the invention is to provide a method for preparing high molecular weight linear polyamide condensation products from amino acid amides without first having to make amino acids.

The manner in which these and other objects and features of the invention are attained will appear more fully from the following description thereof, in which reference is made to typical and preferred procedures in order to indicate more fully the nature of the invention, but without intending in any way to limit the scope of the invention thereby.

It is already known that macromolecular polycondensation products of the polyamide type may be made by heating amino acids of the structure $H_2N.CH_2—(CH_2)_n—COOH$. In heating such acids water is split off, and high molecular weight products are obtained which can be spun into fibres. In practice, however, the production of polyamide condensation products in the manner indicated possesses the disadvantage that the starting material is not readily accessible, since all preparative methods known to date yield in the first instance the desired amino acid in the form of a salt of the amine. Furthermore, it is a very difficult task to isolate the free amino acids, particularly in view of the importance that is attached to a high degree of purity for the raw materials employed in the manufacture of synthetic fibres. Finally, it is pointed out that difficulties are encountered in the condensation of some amino acids; this is particularly true of the 5-amino-pentane-carboxylic acid (-1), inasmuch as a more or less considerable portion of this compound is simultaneously converted into lactam (see for example the Journal of the Chemical Society, 1934, page 456) which tends to influence the physical properties of the macromolecular end product in an undesirable manner.

According to the present invention, however, it has been found that polycondensation products of the polyamide type, practically free of lactam, can be formed by heating bifunctional omega-amino normal saturated aliphatic acid amides having at least six carbon atoms. This type of amino acid amides, and their preparation, are described and claimed in copending application Serial No. 706,514, filed October 29, 1946 by Theodoor Koch et al.

Upon heating a compound of the aforementioned type ammonia is split off and the desired polycondensation product is formed, the reaction being represented qualitatively by the following equation:

$$H_2N.CH_2—(CH_2)_n—CO.NH_2 \rightarrow \ldots HN.CH_2—(CH_2)_n—CO.NH.CH_2—(CH_2)_n—CO \ldots + NH_3$$

This reaction proceeds very readily if the reaction mass comprising the amino acid amide is first heated in the presence of a small amount of water in an autoclave under pressure. It appears that first of all the amino acid amide is hydrolized in the presence of the water, whereupon the acid thus obtained forms, with an amino-$NH_2$ group from the other end of another molecule, the above-indicated amide "knot" or linkage, $$\begin{array}{c} -C-N- \\ \parallel \phantom{-}\vert \\ O \phantom{-} H \end{array}$$

To speed up the reaction it is advisable to remove, either continuously or intermittently, the ammonia that is split off by connecting the autoclave with a rectifying column which is also kept under pressure, and at the top of which there is provided a reducing valve. This pre-condensation operation yields only relatively low molecular weight condensates.

When practically no more ammonia escapes, the pressure in the system is let down entirely and the moltent half-polymer obtained by the procedure thus far described is subjected to a further, preferably higher or more intensive, heating, in order to remove the water component from the reaction mass. An after-condensation then takes place, whereby the mass attains a viscosity high enough to permit the spinning of threads therefrom. As the melting point rises during this step, the heating operation during this stage is preferably carried out at a somewhat higher temperature than during the pre-condensation stage.

If desired, this step of after-condensation may be carried out wholly or partly under decreased pressure.

In the different stages of the treatment materials may be added to the reaction mixture which accelerate or stabilize the reaction, such as small amounts of organic acids, aromatic sulfo-acids, organic bases and the like. In any event, a completely oxygen-free atmosphere is desired in order to prevent oxidation and brown-coloration. Furthermore, if desired, one can mix the starting material, either before or during the reaction, with other materials which under the conditions of condensation of the amino acid amide likewise are converted into the macromolecular state. Thus one can, for example, add salts of dicarboxylic acids and diamines, whereby the physical properties of the end product can be markedly varied. If water separates during the condensation of these added materials, it is often unnecessary to add extra water to the reaction mixture comprising the amino acid amide to "trigger" the desired polycondensation reaction.

In order to indicate still more fully the nature of the present invention, the following examples of typical procedure are set forth, it being understood that these examples are presented as illustrative only, and that they are not intended to limit the scope of the invention.

*Example 1*

10 kg. of ε-amino-caproamide,

and 500 cc. of water were placed in an autoclave (made of V₂A-steel) communicating with a rectifying column. The mass was heated for five hours at 200° C., the ammonia gas that was generated being occasionally let out of the system by means of an adjustable pressure valve. Thereafter the excess pressure in the system was let down and the water vapor still present in the system was replaced by nitrogen. Finally, the temperature of the mass was raised to 260° C. and the heating continued for five more hours.

There was obtained in this manner a colorless condensation product which contained practically no lactam, and which could be spun into threads having very good properties.

*Example 2*

200 grams of η-amino-caprylamide,

were mixed with 100 grams of hexamethylene diammonium sebacate and 1 gram of ammonium acetate, and this mixture was heated for six hours in an autoclave at 250° C. The ammonia gas formed during the course of the reaction was removed regularly. Thereafter the pressure in the system was let down and the half-polymer obtained was heated for three hours under vacuum at 265° C.

There was obtained in this manner a mixed polycondensation product which could be spun into threads which were of a quality well adapted for cold drawing.

While the specific examples set forth above describe in detail the preparation of macromolecular polycondensation products obtainable from a six-carbon-atom omega-amino normal saturated aliphatic acid amide and from an eight-carbon-atom omega-amino normal saturated aliphatic acid amide, the invention is also applicable in a similar manner to the preparation of macromolecular polycondensation products obtainable from higher homologues of these compounds, such as ζ-amino-enanthamide, θ-amino-pelargonamide and ι-amino-capramide, each of which may be readily converted into a macromolecular polycondensation product of the linear polyamide type having desirable properties for spinning into fibres, etc. Generally speaking, therefore, the present invention is applicable to the preparation of macromolecular polycondensation products of the linear polyamide type obtainable by subjecting to condensation omega-amino acid amides corresponding to the structural formula $H_2N.CH_2—(CH_2)_n—CO.NH_2$, where $n$ is an integer varying from 4 to 8, and to the macromolecular polycondensation thereby obtained.

While various specific examples of preferred compositions and methods embodying the present invention have been described above, it will be apparent that many changes and modifications may be made in the methods of procedure, and that a wide variety of specific reagents may be employed in carrying out the procedure. It should therefore be understood that the examples cited and the particular proportions, methods of procedure set forth above are intended to be illustrative only, and are not intended to limit the scope of the invention.

What is claimed is:

1. A method for the preparation of a macromolecular polycondensation product comprising heating a monomeric material consisting of an omega-amino normal saturated aliphatic carboxylic acid amide having the formula

where $n$ is an integer varying from 4 to 8, under pressure and in the presence of a relatively small amount of water sufficient to bring about hydrolysis thereof, thereby converting same to a relatively low molecular weight pre-condensation product and removing from the reaction zone ammonia gas that is liberated during the reaction, and thereafter when practically no more ammonia escapes from the reaction zone further heating the thus-obtained relatively low molecular weight pre-condensation product at a higher temperature and at a lower pressure than were employed during the initial heating of the omega-amino carboxylic acid amide to form the said pre-condensation product, thereby converting said pre-condensation product to said macromolecular polycondensation product of relatively high molecular weight and of spinnable viscosity.

2. A method as in claim 1 wherein the said omega-amino normal saturated aliphatic carboxylic acid amide is ε-amino-caproamide.

3. A method as in claim 1 wherein the said omega-amino normal saturated aliphatic carboxylic acid amide is η-amino-caprylamide.

4. A method as in claim 1 wherein the said omega-amino normal saturated aliphatic carboxylic acid amide is ι-amino-capramide.

THEODOOR KOCH.

REFERENCES CITED

The following references are of record in the file of this patent:

UNITED STATES PATENTS

| Number | Name | Date |
|---|---|---|
| 2,071,253 | Carothers | Feb. 16, 1937 |
| 2,163,636 | Spanagel | June 27, 1939 |
| 2,174,527 | Peterson | Oct. 2, 1939 |
| 2,191,367 | Carothers | Feb. 20, 1940 |
| 2,252,555 | Carothers | Aug. 12, 1941 |
| 2,312,879 | Christ | Mar. 2, 1943 |

OTHER REFERENCES

Ser. No. 323,512, Hagedorn (A. P. C.), published Apr. 20, 1943.